United States Patent
Otsuka

(10) Patent No.: US 9,197,442 B2
(45) Date of Patent: Nov. 24, 2015

(54) RELAY APPARATUS AND RELAY METHOD

(71) Applicant: FUJITSU LIMITED, Kawasaki-shi (JP)

(72) Inventor: Hiroshi Otsuka, Inagi (JP)

(73) Assignee: FUJITSU LIMITED, Kawasaki (JP)

( * ) Notice: Subject to any disclaimer, the term of this patent is extended or adjusted under 35 U.S.C. 154(b) by 184 days.

(21) Appl. No.: 13/775,304

(22) Filed: Feb. 25, 2013

(65) Prior Publication Data

US 2013/0243006 A1 Sep. 19, 2013

(30) Foreign Application Priority Data

Mar. 19, 2012 (JP) ................................ 2012-061746

(51) Int. Cl.
| | |
|---|---|
| *H04L 12/46* | (2006.01) |
| *H04L 12/931* | (2013.01) |
| *H04L 12/28* | (2006.01) |
| *H04L 29/08* | (2006.01) |
| *H04N 7/16* | (2011.01) |
| *H04L 12/935* | (2013.01) |
| *H04L 29/06* | (2006.01) |

(52) U.S. Cl.
CPC ........ *H04L 12/4604* (2013.01); *H04L 12/2801* (2013.01); *H04L 29/06* (2013.01); *H04L 49/205* (2013.01); *H04L 49/30* (2013.01); *H04L 49/357* (2013.01); *H04L 49/50* (2013.01); *H04L 49/70* (2013.01); *H04L 67/1097* (2013.01); *H04N 7/163* (2013.01); *H04L 69/16* (2013.01)

(58) Field of Classification Search
CPC ... H04L 49/50; H04L 49/357; H04L 12/4604; H04L 47/10; H04L 47/26; H04L 49/506; H04L 49/70; H04L 49/205; H04L 67/1097

USPC .................................. 370/230, 235, 332, 401
See application file for complete search history.

(56) References Cited

U.S. PATENT DOCUMENTS

| | | | | |
|---|---|---|---|---|
| 6,181,679 B1 * | 1/2001 | Ashton | ............... | H04L 12/2602 370/244 |
| 6,535,927 B1 * | 3/2003 | Kim | .................... | H04L 12/2801 709/231 |

(Continued)

FOREIGN PATENT DOCUMENTS

| | | |
|---|---|---|
| JP | 2005-5921 A | 1/2005 |
| JP | 2005-267599 | 9/2005 |

(Continued)

OTHER PUBLICATIONS

Japanese Office Action mailed Aug. 25, 2015 for corresponding Japanese Patent Application No. 2012-061746, with Partial English Translation, 5 pages.

*Primary Examiner* — Jae Y Lee
*Assistant Examiner* — Jean F Voltaire
(74) *Attorney, Agent, or Firm* — Fujitsu Patent Center

(57) ABSTRACT

A first port included in a relay apparatus transmits a first type of frame to a second relay apparatus. A second port transmits a second type of frame to the second relay apparatus. A control unit specifies on the basis of transfer information that a transfer destination port of the first type of frame which is for accessing a node connected to the second relay apparatus is the first port. After that, the control unit generates the second type of frame including the first type of frame according to a load on the first port. Instead of transmitting the first type of frame from the first port, the control unit transmits the second type of frame from the second port.

6 Claims, 15 Drawing Sheets

(56) References Cited

U.S. PATENT DOCUMENTS

| | | |
|---|---|---|
| 7,602,777 B2 | 10/2009 | Ho et al. |
| 7,957,285 B1 * | 6/2011 | Pannell .................. H04L 47/10 370/230 |
| 2003/0048796 A1 * | 3/2003 | Yabe ................... H04L 12/2856 370/401 |
| 2003/0212817 A1 * | 11/2003 | Matthews ........... H04L 12/2854 709/238 |
| 2005/0210028 A1 | 9/2005 | Kodama |
| 2005/0267986 A1 * | 12/2005 | Murakami .......... H04L 67/1097 709/238 |
| 2006/0067217 A1 | 3/2006 | Li et al. |
| 2009/0161692 A1 | 6/2009 | Hirata et al. |
| 2012/0057602 A1 * | 3/2012 | Tanimoto ............ H04L 41/0893 370/401 |
| 2012/0314605 A1 | 12/2012 | Akiyoshi |

FOREIGN PATENT DOCUMENTS

| | | |
|---|---|---|
| JP | 2006-109454 A | 4/2006 |
| JP | 2008-524936 | 7/2008 |
| JP | 2009-100162 A | 5/2009 |
| JP | 2011-508523 | 3/2011 |
| WO | 2011/108205 A1 | 9/2011 |

\* cited by examiner

FIG. 8

| POLICY MANAGEMENT TABLE | | | 124 |
|---|---|---|---|
| POLICY ID | SETTING NAME | VALUE | |
| 1 | DCB BYPASSING PROCESS | VALID | |
| | BYPASSING LOAD THRESHOLD | 75% | |
| | FAILOVER | VALID | |
| | APPLICATION | List1 | |
| ... | ... | ... | |

FIG. 13A

| FC TRANSFER TABLE | | 121a |
|---|---|
| DOMAIN NUMBER | PORT NUMBER |
| 0x02 | 0x07 |
| 0x03 | 0x07 |

FIG. 13B

| FC TRANSFER TABLE | | 221a |
|---|---|
| DOMAIN NUMBER | PORT NUMBER |
| 0x01 | 0x05 |
| 0x03 | 0x08 |

FIG. 13C

| FC TRANSFER TABLE | | 321 |
|---|---|
| DOMAIN NUMBER | PORT NUMBER |
| 0x01 | 0x06 |
| 0x02 | 0x06 |

| MAC TRANSFER TABLE | | | | 123a |
|---|---|---|---|---|
| MAC ADDRESS | DOMAIN NUMBER | STATE | PORT NUMBER | |
| MAC2 | 0x02 | CONNECTED | 0x03 | |
| MAC2 | 0x03 | CONNECTED | 0x03 | |

FIG. 14A

| MAC TRANSFER TABLE | | | | 223a |
|---|---|---|---|---|
| MAC ADDRESS | DOMAIN NUMBER | STATE | PORT NUMBER | |
| MAC1 | 0x01 | CONNECTED | 0x01 | |
| MAC3 | 0x03 | CONNECTED | 0x04 | |

FIG. 14B

| MAC TRANSFER TABLE | | | | 323 |
|---|---|---|---|---|
| MAC ADDRESS | DOMAIN NUMBER | STATE | PORT NUMBER | |
| MAC2 | 0x01 | CONNECTED | 0x02 | |
| MAC2 | 0x02 | CONNECTED | 0x02 | |

FIG. 14C

RELAY APPARATUS AND RELAY METHOD

CROSS-REFERENCE TO RELATED APPLICATION

This application is based upon and claims the benefit of priority of the prior Japanese Patent Application No. 2012-061746, filed on Mar. 19, 2012, the entire contents of which are incorporated herein by reference.

FIELD

The embodiments discussed herein are related to a relay apparatus and a relay method.

BACKGROUND

Storage systems in which an information processing apparatus, such as a computer, and a storage apparatus are connected to a network are used. The network includes a relay apparatus which relays communication between nodes (such as an information processing apparatus and a storage apparatus). An information processing apparatus accesses a storage apparatus via a network. A network for a storage system may be referred to as a SAN (Storage Area Network). In a SAN Fibre Channel (FC), Ethernet (registered trademark), or the like is used as a network interface.

An information processing apparatus may be connected both to an FC network and to an Ethernet network. For example, an information processing apparatus may be connected to a SAN using FC and a SAN using Ethernet or be connected to a SAN using FC and a LAN (Local Area Network). In this case, the information processing apparatus may include both an FC adapter and an Ethernet adapter. However, if the information processing apparatus includes both an FC adapter and an Ethernet adapter, wiring may get complicated because wiring is performed according to adapters. Accordingly, the use of an adapter meeting Fibre Channel over Ethernet (FCoE) is proposed. The use of a single adapter meeting FCoE makes it possible to access both an FC network and an Ethernet network. As a result, wiring can be simplified.

With FCoE a unit of communication (FC frame) in FC is encapsulated in a unit of communication (Ethernet frame) in Ethernet. With FCoE enhanced Ethernet is used for performing communication by encapsulating an FC frame. The enhanced Ethernet may be referred to as DCB (Data Center Bridging). For example, a relay apparatus meeting FCoE includes both an FC port and an a DCB port. The relay apparatus extracts an FC frame from an Ethernet frame and transfers the FC frame from the FC port, or transfers an Ethernet frame from the DCB port.

A path along which a frame is transferred is selected in advance between relay apparatus by the use of, for example, a determined protocol and is held as transfer information by each relay apparatus. When a relay apparatus transfers a frame, it specifies on the basis of the transfer information a port where the frame is transferred. For example, when there is a change (blockage of a path or the like) in network, the transfer information is rewritten.

The following cross connect structure is proposed. When a plurality of communication paths can be used for relaying data, a faulty communication path of them is managed and control is exercised so as to stitch a data transfer path from the faulty communication path to a normal communication path.
Japanese Laid-open Patent Publication No. 2011-508523
Japanese Laid-open Patent Publication No. 2008-524936
Japanese Laid-open Patent Publication No. 2005-267599

As stated above, some relay apparatus can relay a first type of frame and a second type of frame which can include the first type of frame. With such relay apparatus transmitting a frame from a port specified on the basis of transfer information is not necessarily efficient. The reason for this is as follows. A load on the port may be heavy. Transmitting an additional frame from the port may increase the load on the port and a delay in communication may occur.

At this time there may be a path via a different type of port (DCB port for an FC port, for example) to a second relay apparatus to which an access destination node is connected. When a frame is transmitted to the second relay apparatus, usually a port determined by the transfer information is used. A load on the different type of port may be light. However, if the transfer information is not rewritten, the frame is transmitted from the same port that is determined by the transfer information. Accordingly, it is difficult to use the different type of port as a transfer destination port in place of the port determined by the transfer information.

SUMMARY

According to an aspect, there is provided a relay apparatus used for relaying a first type of frame and a second type of frame which can include the first type of frame. The relay apparatus includes a first port which transmits the first type of frame to a second relay apparatus, a second port which transmits the second type of frame to the second relay apparatus, and a control unit which generates, after specifying on the basis of transfer information for specifying a transfer destination port of the first type of frame that the transfer destination port of the first type of frame which is for accessing a node connected to the second relay apparatus is the first port, the second type of frame including the first type of frame according to a load on the first port and which transmits the second type of frame from the second port instead of transmitting the first type of frame from the first port.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 8 is an example of a policy management table in the second embodiment;

FIGS. 13A, 13B, and 13C are examples of an FC transfer table in the third embodiment;

FIGS. 14A, 14B, and 14C are examples of a MAC transfer table in the third embodiment.

DESCRIPTION OF EMBODIMENTS

Figure 1:
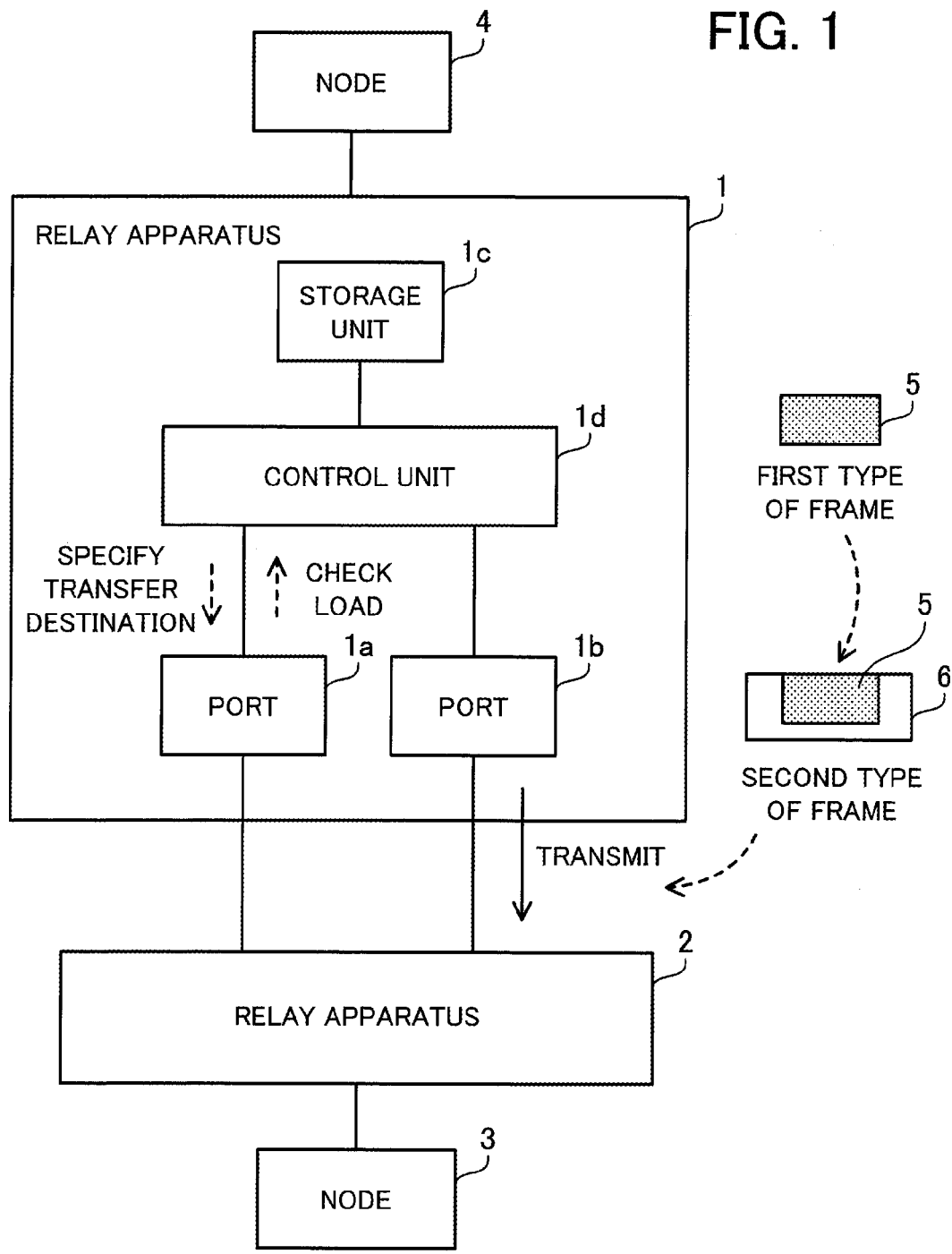
FIG. 1 illustrates a relay apparatus according to a first embodiment.

Embodiments will now be described with reference to the accompanying drawings, wherein like reference numerals refer to like elements throughout.

First Embodiment

FIG. 1 illustrates a relay apparatus according to a first embodiment. A relay apparatus 1 relays a first type of frame 5 and a second type of frame 6 which can include the first type of frame 5. The relay apparatus 1 is connected to a relay apparatus 2. The relay apparatus 2 is connected to a node 3. The relay apparatus 1 is connected to a node 4. Each of the nodes 3 and 4 is an information processing apparatus, a storage apparatus, or the like. The relay apparatus 1 includes ports 1a and 1b, a storage unit 1c, and a control unit 1d. The relay apparatus 2 has the same function that the relay apparatus 1 has.

The port 1a transmits a first type of frame 5 to the relay apparatus 2. The port 1a is, for example, an FC port. The first type of frame 5 is, for example, an FC frame.

The port 1b transmits a second type of frame 6 to the relay apparatus 2. The port 1b is, for example, a DCB port. The second type of frame 6 is, for example, an Ethernet frame in which an FC frame can be encapsulated. That is to say, the relay apparatus 1 is connected to the relay apparatus 2 via two communication paths through the different types of ports 1a and 1b respectively. The relay apparatus 1 may be connected directly or indirectly to the relay apparatus 2. For example, another relay apparatus may be located between the relay apparatus 1 and 2.

The storage unit 1c stores transfer information for specifying a transfer destination port of a first type of frame. The transfer information may also be referred to as routing information, a routing table, or the like. With FCoE, for example, the FSPF (Fabric Shortest Path First) protocol is used, network topology information is shared in advance by relay apparatus, and transfer information is generated. The transfer information is held by each relay apparatus and is used for specifying a transfer destination port of a frame.

After specifying on the basis of transfer information stored in the storage unit 1c that a port which is for accessing the node 3 connected to the relay apparatus 2 and which is a transfer destination of the first type of frame 5 is the port 1a, the control unit 1d checks a load on the port 1a. The control unit 1d generates a second type of frame 6 including the first type of frame 5 according to the load on the port 1a. The control unit 1d transmits the second type of frame 6 from the port 1b instead of transmitting the first type of frame 5 from the port 1a. For example, if a value indicative of a load corresponding to the state of the port 1a is higher than a determined threshold, then the control unit 1d may generate a second type of frame 6 and transmit it from the port 1b.

According to the relay apparatus 1, the control unit 1d specifies on the basis of the transfer information that a port which is for accessing the node 3 connected to the relay apparatus 2 and which is a transfer destination of the first type of frame 5 is the port 1a. After that, the control unit 1d generates the second type of frame 6 including the first type of frame 5 according to a load on the port 1a. Furthermore, the control unit 1d transmit the second type of frame 6 from the port 1b instead of transmitting the first type of frame 5 from the port 1a.

As a result, communication paths can be used efficiently. For example, the relay apparatus 1 is connected to the relay apparatus 2 via the ports 1a and 1b. When the node 4 accesses the node 3, two (FC and DCB, for example) communication paths through the ports 1a and 1b are formed in the relay apparatus 1.

For example, it is assumed that the port 1a is selected as a transfer destination on the basis of the transfer information. Even if there is a communication path through the port 1b, it is difficult to use the port 1b as a transfer destination port. Accordingly, even when a load on the port 1a is heavy, the first type of frame 5 is transmitted from the port 1a. This causes a communication delay.

Therefore, the relay apparatus 1 according to the first embodiment specifies on the basis of the transfer information that the port 1a is a transfer destination. After that, the relay apparatus 1 can generate a second type of frame 6 including the first type of frame 5 according to a load on the port 1a and transmit the second type of frame 6 from the port 1b instead of transmitting the first type of frame 5 from the port 1a. As a result, even if a load on, for example, the port 1a is heavy and the relay apparatus 1 specifies that the port 1a is a transfer destination port, the port 1b can efficiently be used as a roundabout path in place of the port 1a.

In the first embodiment, a case where the relay apparatus 1 specifies that the first type of frame 5 is transferred from the port 1a has been described. On the other hand, the relay apparatus 1 may specify, depending on the contents of the transfer information, that a first type of frame 5 is transferred from the port 1b. In this case, the relay apparatus 1 can transmit the first type of frame 5 from the port 1a according to a load on the port 1b instead of transmitting a second type of frame 6 including the first type of frame 5 from the port 1b. Accordingly, even in this case, the two communication paths can be used efficiently.

Second Embodiment

Figure 2:
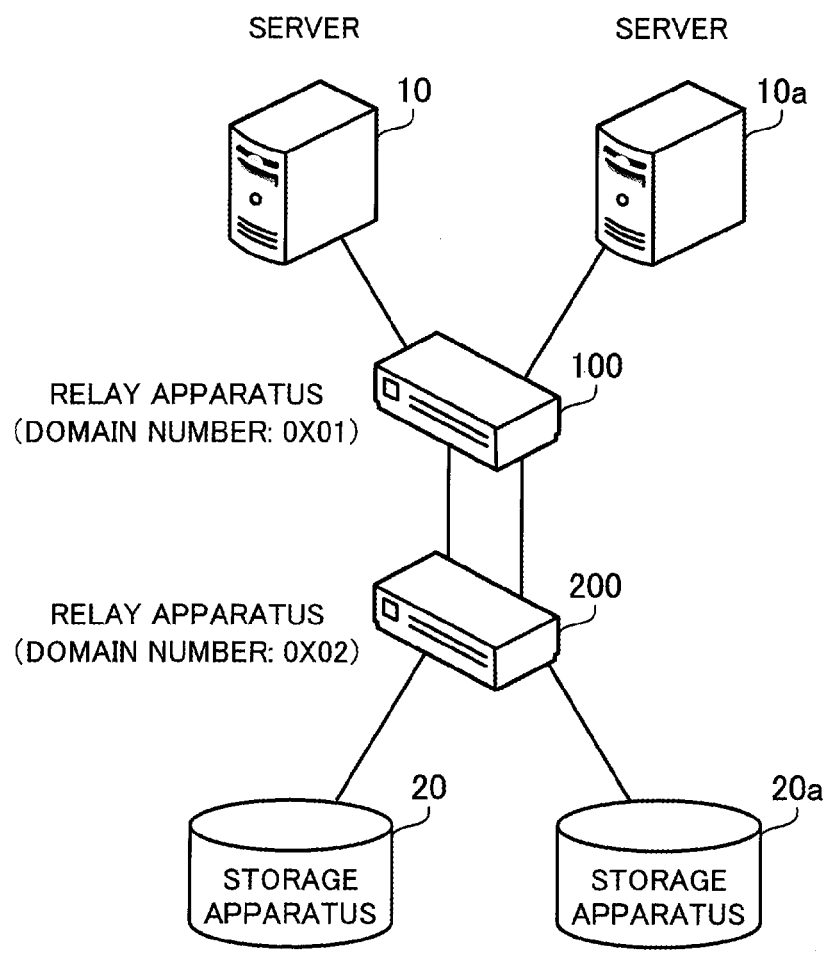
FIG. 2 illustrates a storage system according to a second embodiment.

FIG. 2 illustrates a storage system according to a second embodiment. A storage system according to a second embodiment includes servers 10 and 10a, storage apparatus 20 and 20a, and relay apparatus 100 and 200. In the storage system according to the second embodiment, the server 10 or 10a accesses the storage apparatus 20 or 20a via a SAN. The servers 10 and 10a and the storage apparatus 20 and 20a are nodes connected to the SAN. The SAN includes the relay apparatus 100 and 200.

The server 10 or 10a is a server computer which writes data to the storage apparatus 20 or 20a or reads out data stored in the storage apparatus 20 or 20a.

The storage apparatus 20 or 20a is an external storage unit for storing data used by the server 10 or 10a for performing a process.

The relay apparatus 100 or 200 relays communication between the server 10 or 10a and the storage apparatus 20 or 20a. The relay apparatus 100 and 200 are cascade-connected via two interfaces. A first interface is FC. A second interface is DCB. The second interface may be enhanced Ethernet referred to as CEE (Converged Enhanced Ethernet), DCE (Data Center Ethernet), or the like. Enhanced Ethernet, such as DCB, CEE, or DCE, in which an FC frame is encapsulated and which can realize the same reliability that FC can realize may be referred to as lossless Ethernet.

The relay apparatus 100 or 200 is an element of topology referred to as a fabric in FC, and relays communication between a plurality of nodes. The term "fabric" may also be used as a term which means a network unit including a plurality of relay apparatus.

It is assumed that a domain number of the relay apparatus 100 is "0x01" and that a domain number of the relay apparatus 200 is "0x02". A domain number is identification information uniquely assigned to the relay apparatus 100 or 200 in a fabric. The relay apparatus 100 and 200 meet FCoE. The relay apparatus 100 or 200 has the function of encapsulating an FC frame in an Ethernet frame or extracting an FC frame from an Ethernet frame. In the following description an Ethernet frame in which an FC frame is encapsulated may be referred to as an FCoE frame.

Figure 3:
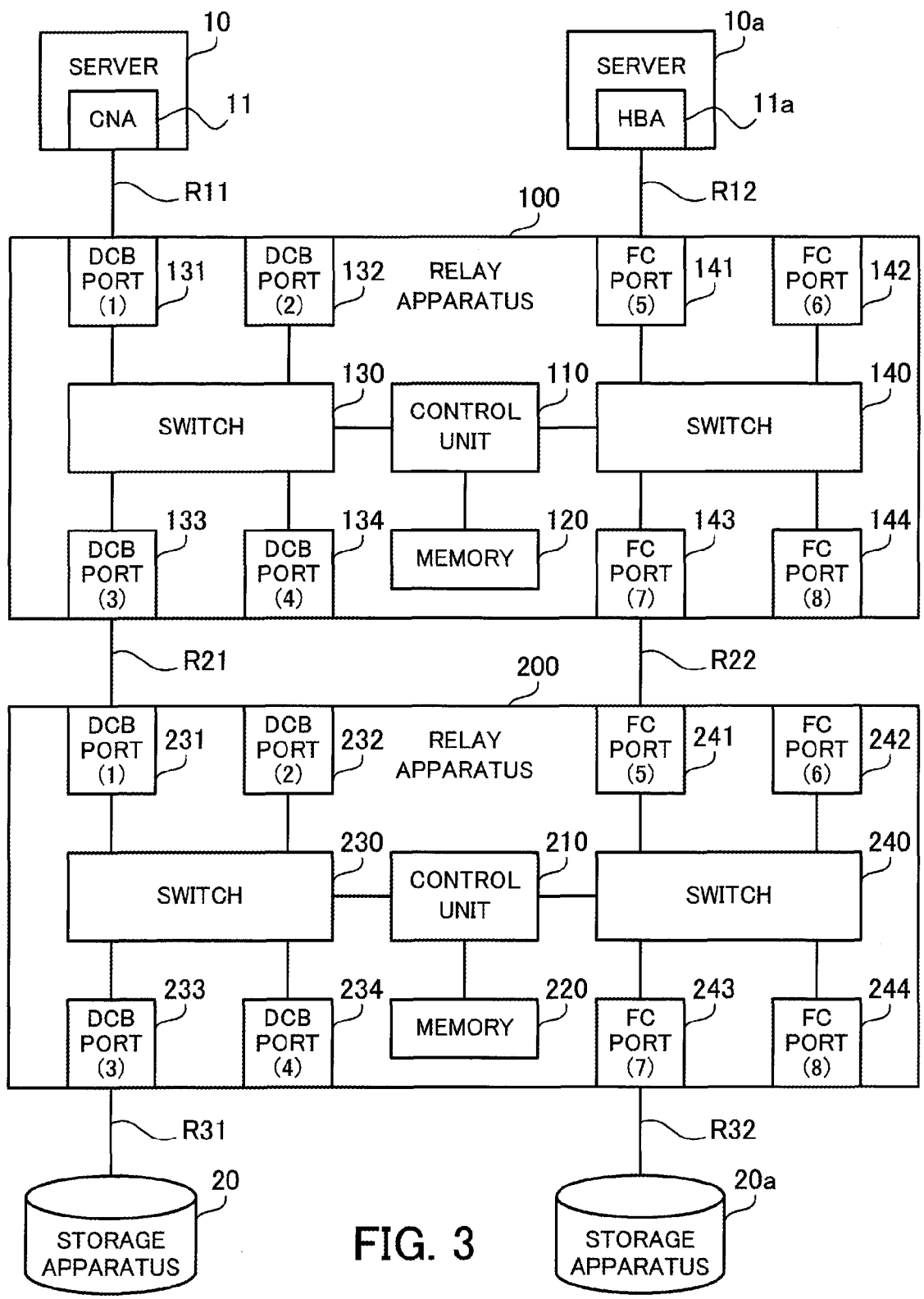
FIG. 3 is an example of hardware of relay apparatus in the second embodiment.

FIG. 3 is an example of hardware of the relay apparatus in the second embodiment. The relay apparatus 100 includes a control unit 110, a memory 120, switches 130 and 140, DCB ports 131, 132, 133, and 134, and FC ports 141, 142, 143, and 144.

The control unit 110 is an electronic circuit which controls processes in the relay apparatus 100 for transferring various frames. For example, the control unit 110 may be an ASIC (Application Specific Integrated Circuit), an FPGA (Field Programmable Gate Array), or a general-purpose processor which executes a firmware program stored in the memory 120.

The memory 120 is a storage unit which stores a program which the control unit 110 executes or data which the control unit 110 uses for performing a process. The memory 120 includes a volatile memory and a nonvolatile memory. For example, the memory 120 stores various pieces of information used for frame transfer.

The switch 130 or 140 is an internal switch which assigns various frames in accordance with instructions from the control unit 110.

The switch 130 is connected to the DCB ports 131, 132, 133, and 134. The DCB ports 131, 132, 133, and 134 are DCB interfaces.

The switch 140 is connected to the FC ports 141, 142, 143, and 144. The FC ports 141, 142, 143, and 144 are FC interfaces.

The relay apparatus 200 includes a control unit 210, a memory 220, switches 230 and 240, DCB ports 231, 232, 233, and 234, and FC ports 241, 242, 243, and 244. Each component included in the relay apparatus 200 is the same as that included in the relay apparatus 100 and having the same name.

The server 10 includes a CNA (Converged Network Adapter) 11. The CNA 11 is an adapter which can transmit an FCoE frame from a DCB port. The DCB port included in the CNA 11 may be referred to as a virtual node port (VN_Port).

Furthermore, the server 10a includes an HBA (Host Bus Adapter) 11a. The HBA 11a is an adapter which transmits an FC frame from an FC port. The FC port included in the HBA 11a may be referred to as a node port (N_Port).

The storage apparatus 20 includes a CNA. This is the same with the server 10. The storage apparatus 20 extracts an FC frame from an FCoE frame and performs data handling according to the FC frame. Accordingly, when the server 10 accesses the storage apparatus 20, the server 10 transmits an FCoE frame to the relay apparatus 100. The storage apparatus 20 may be accessible according to another protocol, such as iSCSI (internet Small Computer System Interface), iFCP (internet Fibre Channel Protocol), or FCIP (Fibre Channel over Internet Protocol), using Ethernet other than FCoE. If the storage apparatus 20 is used as a NAS (Network Attached Storage), a protocol for accessing the NAS may be used. In that case, the control unit 110 or 210 may have the function of a gateway which makes an exchange between FC and one of these protocols.

The storage apparatus 20a includes an adapter for FC connection. This is the same with the server 10a.

In addition, there are paths R11, R12, R21, R22, R31, and R32 in the storage system according to the second embodiment. These paths are formed by physically connecting ports by, for example, FC cables.

The path R11 connects the CNA 11 and the DCB port 131. The path R12 connects the HBA 11a and the FC port 141. The path R21 connects the DCB ports 133 and 231. The path R22 connects the FC ports 143 and 241. The path R31 connects the DCB port 233 and the CNA included in the storage apparatus 20. The path R32 connects the FC port 243 and the adapter for FC connection included in the storage apparatus 20a.

That is to say, the two paths R21 and R22 which differ in protocol are between the relay apparatus 100 and 200. The path R21 is a DCB path and the path R22 is an FC path.

It is assumed that the port numbers "0x01", "0x02", "0x03", and "0x04" are virtually assigned to the DCB ports 131, 132, 133, and 134, respectively, of the relay apparatus 100 so that each relay apparatus can identify these ports. In FIG. 3, only the last digit of each port number is indicated within parentheses. For example, the port number "0x01" is indicated by "(1)". In addition, it is assumed that the port numbers "0x05", "0x06", "0x07", and "0x08" are assigned to the FC ports 141, 142, 143, and 144, respectively, of the relay apparatus 100.

Similarly, it is assumed that the port numbers "0x01", "0x02", "0x03", and "0x04" are virtually assigned to the DCB ports 231, 232, 233, and 234, respectively, of the relay apparatus 200. In addition, it is assumed that the port numbers "0x05", "0x06", "0x07", and "0x08" are assigned to the FC ports 241, 242, 243, and 244, respectively, of the relay apparatus 200.

Figure 4:
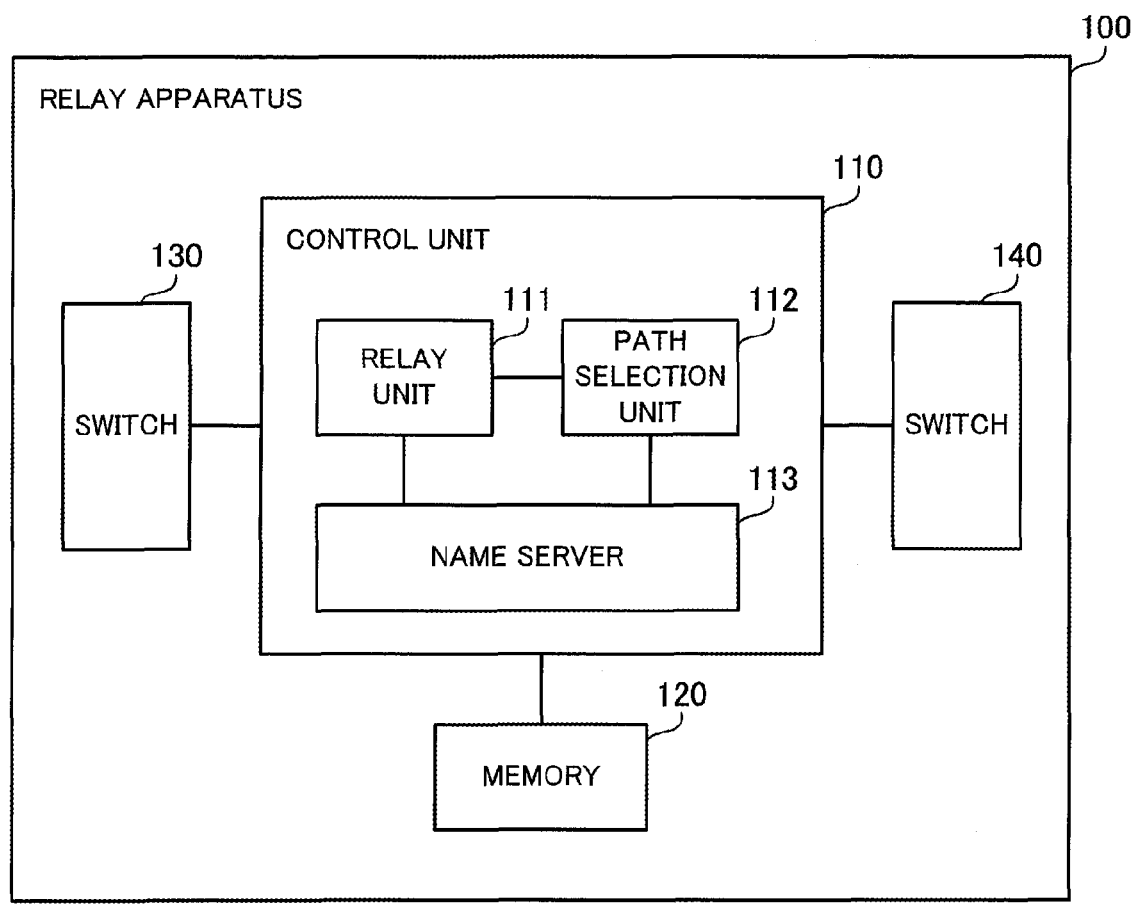
FIG. 4 is an example of software of the relay apparatus in the second embodiment.

FIG. 4 is an example of software of the relay apparatus in the second embodiment. The control unit 110 includes a relay unit 111, a path selection unit 112, and a name server 113. The function of each component included in the control unit 110 may be realized by another ASIC or FPGA. Alternatively, the function of each component may be realized by a program module executed by the control unit 110 included as a processor. The relay apparatus 200 has the same functions that the relay apparatus 100 has.

The relay unit 111 generates FC frame transfer information and stores it in the memory 120. The FC frame transfer information defines the correspondence between an FC frame destination and an FC port included in the relay apparatus 100. For example, the relay unit 111 generates FC frame transfer information by a method provided in FSPF at the time of forming a fabric. To be more concrete, the relay unit 111 makes a comparison of a hop count and a determined link cost corresponding to a domain number for each FC port and assigns to the domain number an FC port by which the shortest communication path is obtained.

In addition, the relay unit 111 generates FCoE frame transfer information by a method (details of which will be described later) different from that provided in FSPF, and stores it in the memory 120. The FCoE frame transfer information defines the correspondence among a transfer destination MAC (Media Access Control) address, an FC frame destination, and a DCB port included in the relay apparatus 100.

The relay unit 111 may generate transfer destination information for an ordinary Ethernet frame and store it in the memory 120. The ordinary Ethernet frame is an Ethernet frame in which an FC frame is not encapsulated. Transfer information for an ordinary Ethernet frame can be generated by learning a MAC address through each DCB port. The relay unit 111 may relay an ordinary Ethernet frame on the basis of the transfer information. An ASIC or the like having the function of MAC in Ethernet may be included (between the control unit 110 and the switch 130, for example) apart from the control unit 110. In that case, the ASIC or the like having the function of MAC can specify an FCoE frame on the basis of a VLAN tag described later and output it to the control unit 110.

The relay unit 111 acquires an FC frame from an FCoE frame received from the server 10 via the DCB port 131, and outputs the FC frame to the path selection unit 112. When the server 10 encapsulates an FC frame for transmission, the server 10 inserts a determined VLAN (Virtual LAN) tag into an FCoE frame. Accordingly, the relay unit 111 can recognize by the VLAN tag that an FC frame is encapsulated in the FCoE frame. A VLAN tag to be designated is determined in advance between the relay apparatus 100 and 200. The relay unit 111 designates in advance for the server 10 a VLAN tag to be designated. Furthermore, the relay unit 111 outputs to the path selection unit 112 an FC frame received from the server 10a via the FC port 141.

In addition, the relay unit 111 transfers an FC frame by the use of a port (transfer destination port) which is a transfer destination and which is determined by the path selection unit 112. At this time, if the transfer destination port is an FC port, then the FC frame remains as it is. If the transfer destination port is a DCB port, then the FC frame is encapsulated in an Ethernet frame to generate an FCoE frame in place of the FC frame.

The path selection unit 112 refers to a destination of an FC frame acquired from the relay unit 111, and specifies a transfer destination FC port on the basis of transfer information for FC frame transfer stored in the memory 120. When the path selection unit 112 specifies a transfer destination FC port, the path selection unit 112 checks the state of a load on the FC port. The path selection unit 112 further determines according to a check result which of the FC port and a DCB port to select as a transfer destination port.

When a node (access source) accesses another node (access destination), the name server 113 resolves an address of the access destination node. For example, port names for unique identification are given in advance to ports of the adapters included in the servers 10 and 10a and the storage apparatus 20 and 20a by a vendor. These port names may be referred to as WWPNs (World Wide Port Names).

For example, when a node is connected to the relay apparatus 100, the name server 113 acquires a WWPN from the node. The name server 113 gives a port ID (IDentifier) which is unique in a fabric to the acquired WWPN. A port ID is information corresponding to an address in a fabric. A virtual port ID is also assigned to a DCB port. Information including the correspondence between a WWPN and a port ID may be referred to as a name server database. The name server database is shared by the relay apparatus 100 and 200. The name server 113 stores the name server database in the memory 120.

For example, a WWPN of a node which each node is to access is designated in advance by a system administrator. When each node accesses another node in accordance with FC, it resolves by the name server 113 a port ID corresponding to the WWPN of the access destination node and sets the port ID as an FC frame destination. The path selection unit 112 refers to the port ID set as an FC frame destination, and determines a transfer destination port.

The name server 113 may be included both in the relay apparatus 100 and in the relay apparatus 200 or be included in one of the relay apparatus 100 and 200.

Figure 5A:
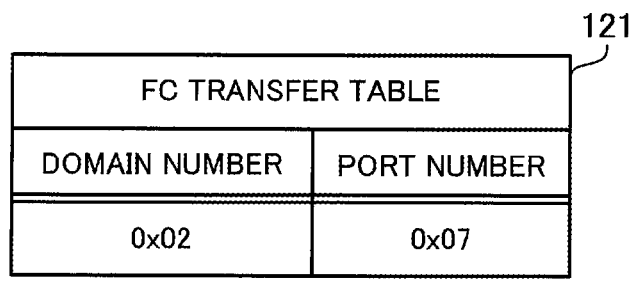
FIGS. 5A and 5B are examples of an FC transfer table in the second embodiment.
Figure 5B:
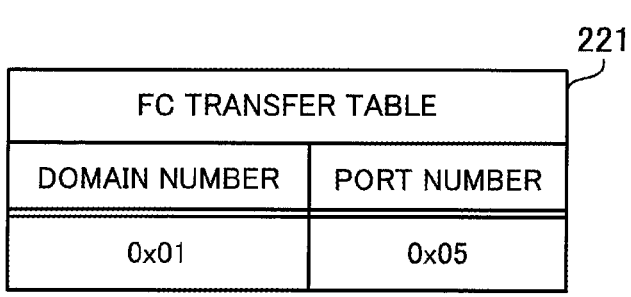

FIGS. 5A and 5B are examples of an FC transfer table in the second embodiment. FIG. 5A indicates an FC transfer table 121 stored in the memory 120. FIG. 5B indicates an FC transfer table 221 stored in the memory 220. The FC transfer tables 121 and 221 are transfer information for FC frame transfer.

Each of the FC transfer tables 121 and 221 includes Domain Number and Port Number items. A domain number of a destination is registered in the Domain Number item. A port number of an FC port of a relay apparatus connected to a destination is registered in the Port Number item.

For example, the port number "0x07" is registered for the domain number "0x02" in the FC transfer table 121. This indicates that a port number of an FC port of the relay apparatus 100 connected to the relay apparatus 200 (domain number of which is "0x02") is "0x07". The port number "0x07" corresponds to the FC port 143.

In addition, for example, the port number "0x05" is registered for the domain number "0x01" in the FC transfer table 221. This indicates that a port number of an FC port of the relay apparatus 200 connected to the relay apparatus 100 (domain number of which is "0x01") is "0x05". The port number "0x05" corresponds to the FC port 241.

As has been described, the relay apparatus 100 or 200 can perform an end-to-end relay of an FC frame on the basis of a port ID and the FC transfer table 121 or 221.

Figure 6:
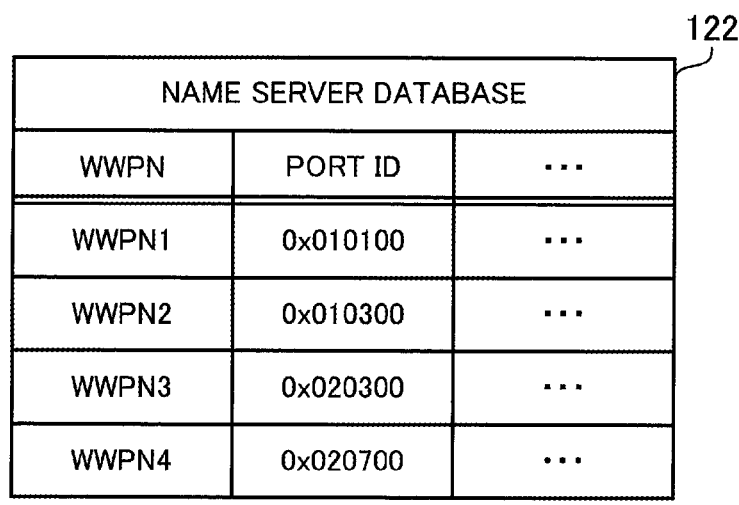
FIG. 6 is an example of a name server database in the second embodiment.

FIG. 6 is an example of a name server database in the second embodiment. A name server database 122 is stored in the memories 120 and 220. The name server database 122 includes WWPN and Port ID items.

WWPNs given to ports on the node side (including node ports and virtual node ports) connected to a fabric are registered in the WWPN item. Port IDs corresponding to the WWPNs are registered in the Port ID item. With FC a port ID is 24-bit information. For example, a domain number of a relay apparatus is mapped to the most significant 8 bits of a port ID. A port number of a port included in the relay apparatus is mapped to the next 8 bits. The least significant 8 bits are, for example, "0x00". A port ID corresponds to an address of a port on the node side.

In the name server database 122, for example, the port ID "0x010100" is assigned to the WWPN "WWPN1". This indicates that a port on the node side the WWPN of which is "WWPN1" is connected to the DCB port 131 (port number of which is "0x01") of the relay apparatus 100 (domain number of which is "0x01").

"WWPN1" is the WWPN of a port included in the CNA 11. "WWPN2" is the WWPN of a port included in the HBA 11a. "WWPN3" is the WWPN of a port included in the adapter of the storage apparatus 20. "WWPN4" is the WWPN of a port included in the adapter of the storage apparatus 20a.

Figure 7A:
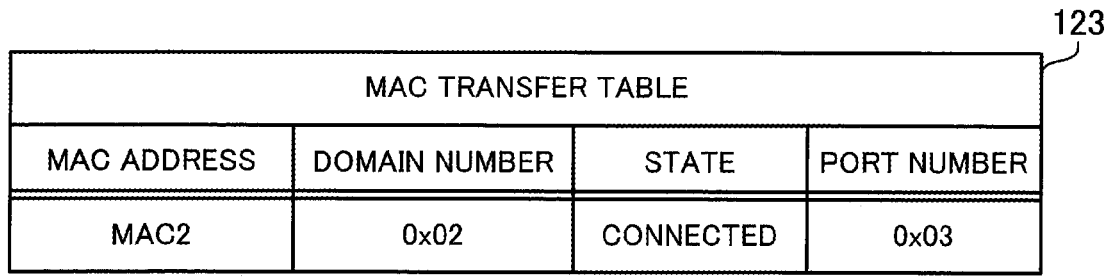
FIGS. 7A and 7B are examples of a MAC transfer table in the second embodiment.
Figure 7B:
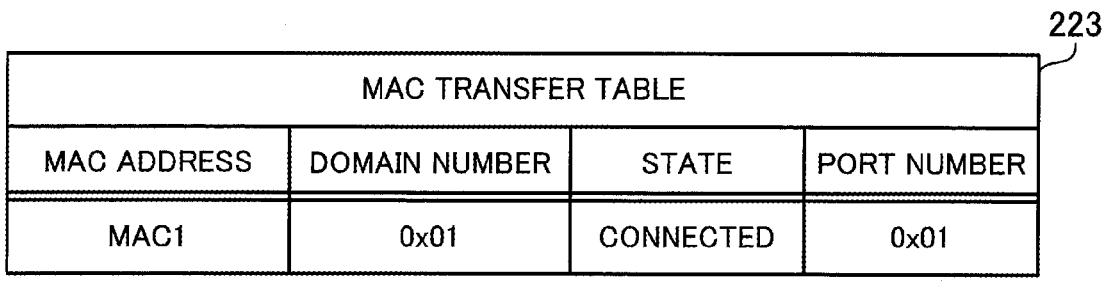

FIGS. 7A and 7B are examples of a MAC transfer table in the second embodiment. FIG. 7A indicates a MAC transfer table 123 stored in the memory 120. FIG. 7B indicates a MAC transfer table 223 stored in the memory 220. The MAC transfer tables 123 and 223 are transfer information for FCoE frame transfer.

Each of the MAC transfer tables 123 and 223 includes MAC Address, Domain Number, State, and Port Number items. A MAC address of a relay apparatus which is an FCoE frame transfer destination is registered in the MAC Address item. A domain number of a destination is registered in the Domain Number item. A state of a port which is an FCoE frame transfer destination is registered in the State item. A port number of a DCB port of a relay apparatus connected to a destination is registered in the Port Number item.

For example, the MAC address "MAC2", the domain number "0x02", the state "connected", and the port number "0x03" are registered in the MAC transfer table 123. These pieces of information indicate that if an FCoE frame is transferred to the relay apparatus 200 (domain number of which is "0x02") by the use of a DCB port, the DCB port 133 (port number of which is "0x03") preferably is used and that a destination MAC address of the FCoE frame is set preferably to "MAC2". The MAC address "MAC2" is a MAC address of the relay apparatus 200.

Furthermore, for example, the MAC address "MAC1", the domain number "0x01", the state "connected", and the port number "0x01" are registered in the MAC transfer table 223. These pieces of information indicate that if an FCoE frame is transferred to the relay apparatus 100 (domain number of which is "0x01") by the use of a DCB port, the DCB port 231 (port number of which is "0x01") preferably is used and that a destination MAC address of the FCoE frame is set preferably to "MAC1". The MAC address "MAC1" is a MAC address of the relay apparatus 100.

As has been described, the relay apparatus 100 or 200 can also perform a hop-by-hop relay of an FCoE frame on the basis of a MAC address and the MAC transfer table 123 or 223.

FIG. 8 is an example of a policy management table in the second embodiment. A policy management table 124 is stored in the memories 120 and 220. The policy management table 124 includes Policy ID, Setting Name, and Value items.

Identification information for a policy is registered in the Policy ID item. A name of a policy setting is registered in the Set Name item. A set value for a setting name is registered in the Value item.

For example, a policy corresponding to the policy ID "1" is registered in the policy management table 124.

For example, the setting name "DCB Bypassing Process" and the value "Valid" are registered. The setting name "DCB Bypassing Process" indicates setting regarding whether to use a DCB port as a roundabout path according to a load on an FC port. The value "Valid" indicates that a DCB port is used as a roundabout path according to a load on an FC port. The value "Invalid" indicates that a DCB port is not used as a roundabout path.

Furthermore, for example, the setting name "Bypassing Load Threshold" and the value "75%" are registered. The setting name "Bypassing Load Threshold" defines a threshold of a load on an FC port in the case of using a DCB port as a roundabout path in place of the FC port. The value "75%" indicates that if a load value is greater than or equal to "75%" (and "DCB Bypassing Process" is "Valid"), bypassing is performed by the use of a DCB port.

For example, a value indicative of the ratio of the current amount of transferred data to all bands at the port may be used as a load value. This ratio may be found by, for example, averaging the amounts of transferred data in a past determined period. A proper value is set as a bypassing load threshold according to operational conditions. For example, "50%" or "100%" may be used. For example, a change in BB (Buffer to Buffer) credit (number of receive buffers included in a port) in a past determined period may be used as another load value (for example, the number of times a BB credit becomes smaller than or equal to a determined value in a past determined period may be used as another load value). In order to determine a load, the number of times the BB credit is drained in the determined period may be acquired on the basis of the number of times the BB credit becomes 0.

In addition, for example, the setting name "Failover" and the value "Valid" are registered. The setting name "Failover" indicates setting regarding whether to use a DCB port as a roundabout path when an FC port cannot be used (when an FC path is blocked). The value "Valid" indicates that a DCB port is used as a roundabout path. The value "Invalid" indicates that a DCB port is not used as a roundabout path.

Moreover, for example, the setting name "Application" and the value "List1" are registered. These pieces of information indicate that each of the above policy settings is used for a node pair indicated by the value "List1". For example, the value "List1" indicates a pair of the server 10 and the storage apparatus 20.

For example, apart from the policy management table 124, the system administrator registers in advance in the memory 120 information by which a combination of "WWPN1" that is the WWPN of the server 10 and "WWPN3" that is the WWPN of the storage apparatus 20 is associated with "List1". This makes it possible to define policy settings finely for the combination of the server 10 and the storage apparatus 20. At this time a distinction may be made between a destination WWPN and a source WWPN. Alternatively, a distinction may not be made between a destination WWPN and a source WWPN. If a distinction is made between a destination WWPN and a source WWPN, then it is possible to define policy settings more finely according to destinations or sources. Furthermore, "List1" may include a plurality of pairs. A plurality of values ("List1" and "List2", for example) may be registered as "Application". Furthermore, a plurality of policies may be registered in the policy management table 124. For example, a policy corresponding to a policy ID other than "1" can be registered for the application "List3".

Figure 9:
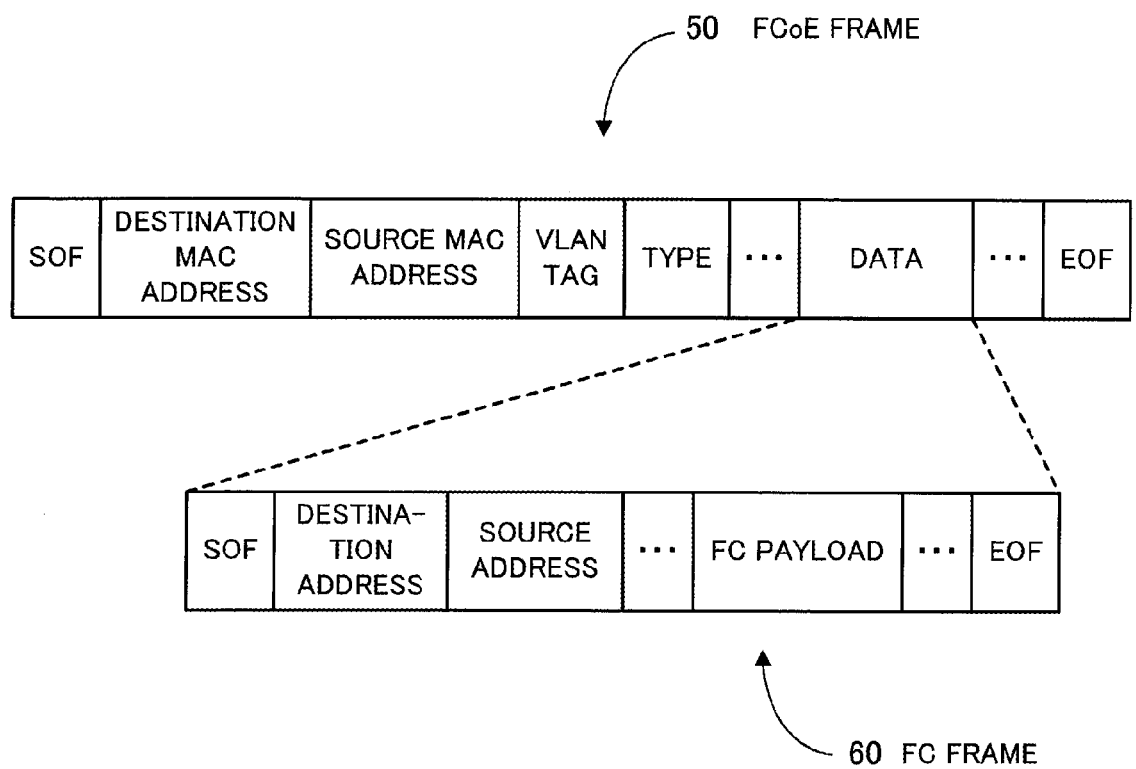
FIG. 9 is examples of a frame in the second embodiment.

FIG. 9 is examples of a frame in the second embodiment. FIG. 9 illustrates an FCoE frame 50 and an FC frame 60. The FCoE frame 50 includes SOF (Start Of Frame), Destination MAC Address, Source MAC Address, VLAN Tag, Type, Data, and EOF (End Of Frame) fields. The fields before (on the SOF side from) the Data field except the SOF field correspond to a header.

Information indicative of the start of the FCoE frame 50 is set in the SOF field. A MAC address of a relay apparatus or a node which is a destination of the FCoE frame 50 is set in the Destination MAC Address field. A MAC address of a relay apparatus or a node which is a source of the FCoE frame 50 is set in the Source MAC Address field. A VLAN tag number is set in the VLAN Tag field. If the FC frame 60 is encapsulated, a determined VLAN tag number is set. A type of the FCoE frame 50 is set in the Type field. For example, if the FC frame 60 is encapsulated, a determined value indicative of FCoE is set in the Type field. The Data field can include the FC frame at the time of encapsulating the FC frame 60. Information indicative of the end of the FCoE frame 50 is set in the EOF field.

The FC frame 60 includes SOF, Destination Address, Source Address, FC Payload, and EOF fields. The fields before (on the SOF side from) the FC Payload field except the SOF field correspond to a header.

Information indicative of the start of the FC frame 60 is set in the SOF field. A destination ID (D_ID) for the FC frame 60 is set in the Destination Address field. A source ID (S_ID) for the FC frame 60 is set in the Source Address field. Data corresponding to an FC access request or a response is set in the FC Payload field. Information indicative of the end of the FC frame 60 is set in the EOF field.

A procedure for a process performed in the storage system having the above structure will now be described. A procedure for registering a MAC address in the MAC transfer table 123 or 223 by the relay apparatus 100 or 200 will be described first.

Figure 10:
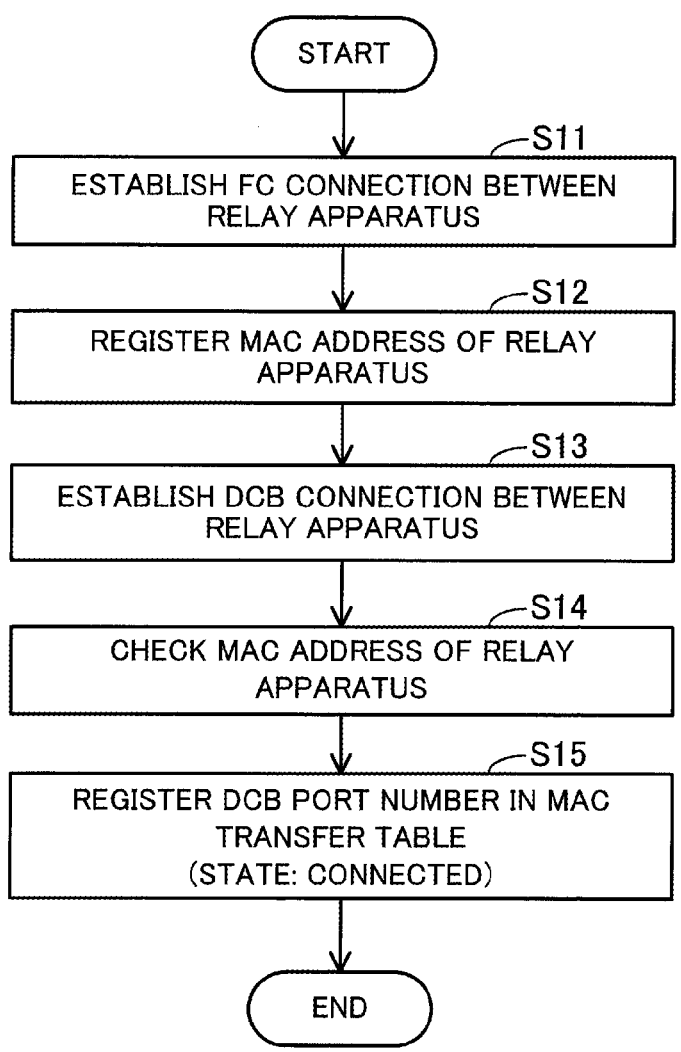
FIG. 10 is a flow chart of an example of MAC address registration in the second embodiment.

FIG. 10 is a flow chart of an example of MAC address registration in the second embodiment. A process indicated in FIG. 10 will now be described in order of step number. A procedure for a process performed by the relay apparatus 100 will now be described. However, the relay apparatus 200 also performs a process through the same procedure. It is assumed that the path R21 or R22 is not formed just before the following step S11.

(Step S11) The path R22 is formed between the relay apparatus 100 and 200. As a result, an FC connection is established between the relay apparatus 100 and 200. The relay unit 111 detects that an FC connection is established between the relay apparatus 100 and 200 by the path R22. The relay unit 111 performs a determined procedure in order to begin communication with the relay apparatus 200. For example, the relay unit 111 executes a group of commands referred to as SW_ILS (Switch Fabric Internal Link Service). At this time the relay unit 111 selects a path by the use of FSPS. By doing so, the relay apparatus 100 and 200 construct the FC transfer tables 121 and 221 respectively.

(Step S12) The relay unit 111 acquires the MAC address "MAC2" and the domain number "0x02" of the relay apparatus 200 from the control unit 210 via the path R22 and registers them in the MAC transfer table 123 stored in the memory 120. A state and a port number corresponding to this MAC address are undetermined, so nothing is set in the State and Port Number items of the MAC transfer table 123. The relay apparatus 200 may be connected further to a second relay apparatus and register a domain number of the second relay apparatus in the MAC transfer table 223. In that case, the relay unit 111 also acquires the domain number of the second relay apparatus from the relay apparatus 200, associates the domain number with the MAC address of the relay apparatus 200, and registers the domain number in the MAC transfer table 123. However, a state and a port number are undetermined, so nothing is set in the State and Port Number items of the MAC transfer table 123.

(Step S13) The path R21 is formed between the relay apparatus 100 and 200. As a result, a DCB connection is established between the relay apparatus 100 and 200. The relay unit 111 detects that a DCB connection is established between the relay apparatus 100 and 200 by the path R21.

(Step S14) The relay unit 111 checks the MAC address of the relay apparatus 200 via the path R21. For example, the relay unit 111 periodically transmits via the path R21 a multicast frame for alive monitoring of another relay apparatus. The relay unit 111 receives a response (Ethernet frame) from the relay apparatus 200 via the path R21. The relay unit 111 checks a MAC address of a source of the Ethernet frame. By doing so, the relay unit 111 can check the presence of a MAC address of the relay apparatus 200 connected (to the DCB port 133) by the path R21. The relay unit 111 checks that a MAC address of the relay apparatus 200 connected to the DCB port 133 matches the MAC address of the relay apparatus 200 registered in step S12 in the MAC transfer table 123.

(Step S15) The relay unit 111 sets the port number "0x03" of the DCB port 133 in the Port Number item corresponding to the MAC address of the MAC transfer table 123, and sets "connected" in the State item.

The relay apparatus 100 registers in this way in the MAC transfer table 123 the correspondence among the MAC address of the relay apparatus 200, the port number of the DCB port 133, and the domain number of the relay apparatus 200. At this time the relay apparatus 100 constructs the MAC transfer table 123 by a method different from that determined in FSPF. By doing so, the relay apparatus 100 can hold the MAC transfer table 123 apart from the FC transfer table 121 constructed by the use of FSPS.

The relay unit 111 monitors the state of a DCB port registered in the MAC transfer table 123. For example, if the path R21 (DCB path) is blocked, then the relay unit 111 changes a state corresponding to a MAC address to "blocked". The relay unit 111 deletes from the MAC transfer table 123 an entry including the MAC address in which the state "blocked" continues for a determined time. This makes it possible to prevent a useless entry from remaining in the MAC transfer table 123. In addition, even after a state is changed to "blocked", the relay unit 111 periodically transmits a multicast frame to perform alive monitoring of a relay apparatus corresponding to a MAC address registered in the MAC transfer table 123. If an Ethernet frame, which is a response, can be received in the determined time after the arising of the "blocked" state, then the state corresponding to the MAC address is changed to "connected".

A procedure for frame transfer performed on the basis of the MAC transfer table 123 will now be described. The following is description of a procedure performed after the completion of the above step S15. Furthermore, it is assumed that the relay apparatus 100 and 200 have constructed the FC transfer tables 121 and 221 respectively and that the relay apparatus 100 and 200 have generated the name server database 122 for the servers 10 and 10a and the storage apparatus 20 and 20a.

The following procedure is performed in a case where an FC frame transfer destination is determined by the use of the FC transfer tables 121 and 221 in preference to the MAC transfer tables 123 and 223.

Which of the FC transfer tables and the MAC transfer tables are preferentially used is determined on the basis of a determined standard. For example, the FC transfer tables 121 and 221 constructed by the use of FSPS are preferentially used. Alternatively, for example, the transfer tables constructed first may preferentially be used. In the above example, the FC path R22 is formed earlier than the DCB path R21. As a result, the FC transfer tables 121 and 221 are constructed earlier than the MAC transfer tables 123 and 223. Accordingly, the FC transfer tables 121 and 221 are preferentially used.

Figure 11:
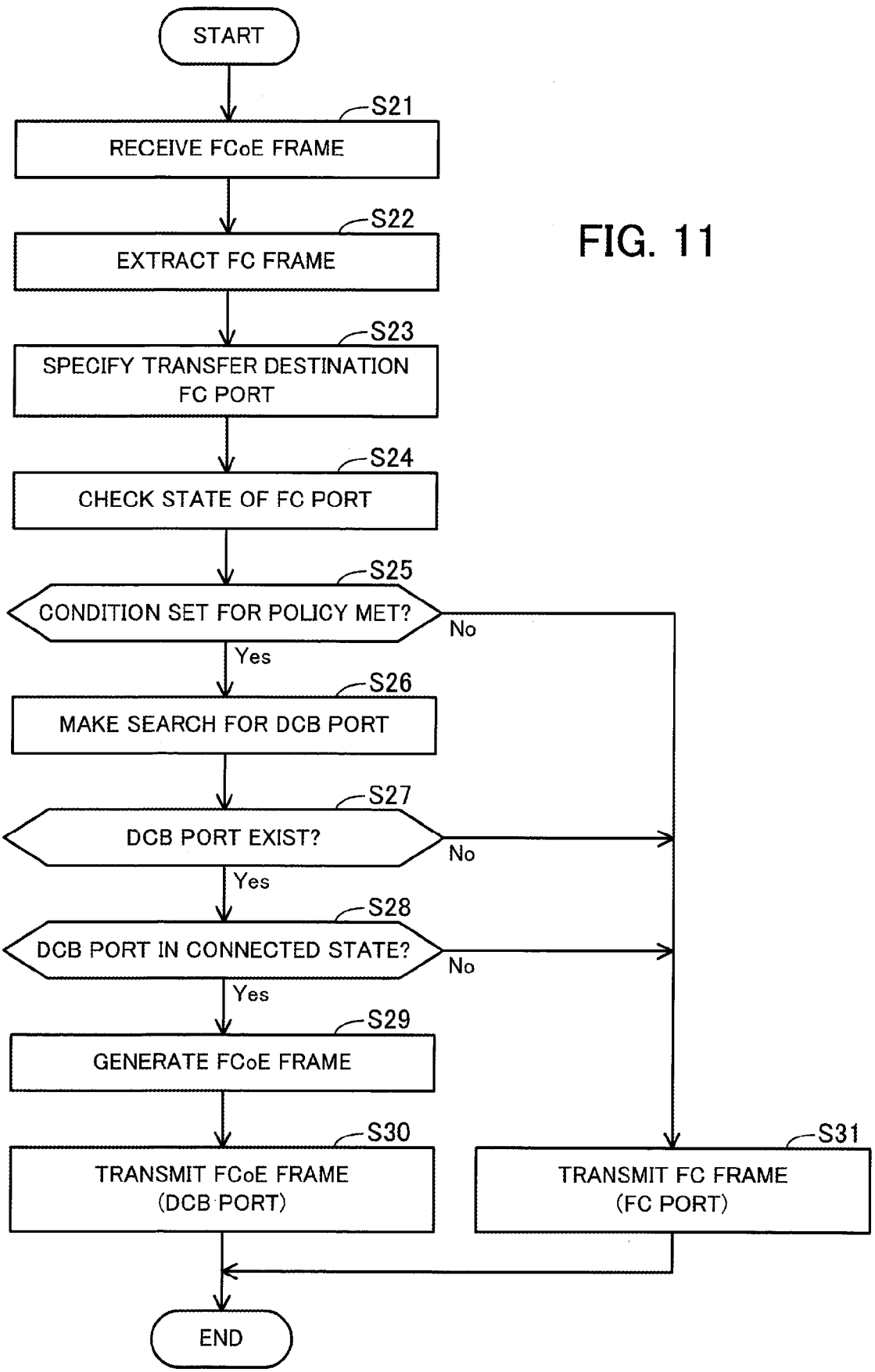
FIG. 11 is a flow chart of an example of frame transfer in the second embodiment.

FIG. 11 is a flow chart of an example of frame transfer in the second embodiment. A process indicated in FIG. 11 will now be described in order of step number. In the following description a case where the server 10 accesses the storage apparatus 20 will be taken as an example.

(Step S21) The relay unit 111 receives an FCoE frame from the server 10 via the path R11. A destination MAC address of the FCoE frame is the MAC address "MAC1" of the relay apparatus 100. For example, before the server 10 begins a determined procedure for making a connection to the fabric, the relay apparatus 100 informs the server 10 in advance of the MAC address of the relay apparatus 100. A source MAC address is, for example, a determined MAC address given in advance to the CNA 11. A destination address of an FC frame included in the FCoE frame is the port ID "0x020300" of the port included in the storage apparatus 20. A source address is the port ID "0x010100" of the port included in the server 10. The server 10 inquires of the name server 113 the WWPN "WWPN3" of the port included in the storage apparatus 20. By doing so, the server 10 can resolve the port ID "0x020300" corresponding to a destination address.

(Step S22) The relay unit 111 removes a header of the FCoE frame, extracts the FC frame, and outputs the FC frame to the path selection unit 112.

(Step S23) The path selection unit 112 acquires the domain number "0x02" of a destination from the most significant 8 bits of the destination address set in the FC frame. The path selection unit 112 refers to the FC transfer table 121 stored in the memory 120, and acquires the port number "0x07" of the FC port 143.

(Step S24) The path selection unit 112 checks the state of the FC port 143. For example, the path selection unit 112 acquires the ratio of used bands to all bands on the basis of, for example, the current amount of transferred data at the FC port 143 or the average of the amounts of transferred data at the FC port 143 in a past determined period. The path selection unit 112 may check the connected or blocked state of the FC port 143.

(Step S25) The path selection unit 112 refers to the policy management table 124 stored in the memory 120, and checks a policy. The path selection unit 112 then determines whether or not the state of the FC port 143 meets a condition (condition for bypassing a path) set for the policy. If the state of the FC port 143 meets the condition set for the policy, then the path selection unit 112 proceeds to step S26. If the state of the FC port 143 does not meet the condition set for the policy, then step S31 is performed. The path selection unit 112 can specify a policy to be checked on the basis of an application. In this example, the destination address of the FC frame is "0x020300" and the source address is the port ID "0x010100". The path selection unit 112 looks up a WWPN corresponding to a port ID in the name server database 122 and obtains "List1" in which a combination of the WWPNs ("WWPN3" and "WWPN1") of the destination and the source is set. Of policies registered in the policy management table 124, the path selection unit 112 checks only a policy an application for which is "List1" and a policy ID of which is "1".

(Step S26) The path selection unit 112 refers to the MAC transfer table 123 stored in the memory 120, and makes a search for the DCB port 133 used as a roundabout path. To be concrete, the path selection unit 112 makes a search for the MAC address "MAC2" and the port number "0x03" corresponding to the domain number "0x02" of the FC frame destination acquired in step S23.

(Step S27) The path selection unit 112 determines whether on not it can make a search for a DCB port in step S26. That is to say, the path selection unit 112 determines whether on not there is a DCB port to be used as a roundabout path. If there is a DCB port to be used as a roundabout path, then the path selection unit 112 proceeds to step S28. If there is no DCB port to be used as a roundabout path, then step S31 is performed.

(Step S28) The path selection unit 112 refers to the MAC transfer table 123 and determines whether or not a state of the DCB port (in this case, the DCB port 133) which it makes a search for in step S26 is "connected". If a state of the DCB port is "connected", then the path selection unit 112 proceeds to step S29. If a state of the DCB port is not "connected" (but "blocked, for example), then step S31 is performed.

(Step S29) The path selection unit 112 informs the relay unit 111 of the port number "0x03" of the DCB port (in this case, the DCB port 133) which it makes a search for in step S26 and the corresponding MAC address "MAC2". The relay unit 111 encapsulates the FC frame in an Ethernet frame to generate an FCoE frame. A destination MAC address of the FCoE frame is "MAC2". A source MAC address of the FCoE frame is the MAC address "MAC1" of the relay apparatus 100. A determined value corresponding to FCoE is set in the VLAN Tag field of the FCoE frame. A determined value indicative of FCoE is set in the Type field of the FCoE frame.

(Step S30) The relay unit 111 transmits the FCoE frame generated in step S29 from the DCB port 133 corresponding to the port number "0x03". The relay unit 111 then terminates the process.

(Step S31) The relay unit 111 transmits the FC frame from the FC port 143 corresponding to the port number "0x07" acquired in step S23. The relay unit 111 then terminates the process.

As has been described, the relay apparatus 100 specifies a transfer destination FC port by a path selection method usually used in FC and then generates an FCoE frame according to a state of an FC port. Instead of transmitting an FC frame from the FC port, the relay apparatus 100 transmits the generated FCoE frame from a DCB port.

In step S25, a case where a condition set for a policy is met may be, for example, the following case. With the policy ID "1" registered in the policy management table 124, a DCB bypassing process is "valid" and a bypassing load threshold is "75%". Therefore, if the FC port 143 is connected and the value of a load on the FC port 143 is greater than or equal to 75%, then the determination that bypassing is performed by the use of a DCB port is made. In addition, with this policy failover is "valid". Accordingly, if the FC port 143 is in a blocked state, the determination that bypassing is performed by the use of a DCB port is also made.

As stated above, another piece of information, such as the number of times a BB credit is drained in a determined period, may be used as information indicative of a load. For example, control can be exercised so as to perform bypassing in the case of the number of times a BB credit is drained in a determined period reaching a threshold and so as not to perform bypassing in the case of the number of times the BB credit is drained in the determined period not reaching the threshold.

Furthermore, another condition may be set for a policy. For example, the condition "when the value of a load on a bypass destination DCB port is smaller than the value of a load on an FC port, bypassing is performed by the use of the DCB port" may be set for the policy ID "1". By doing so, for example, a situation in which bypassing causes an overload on a DCB port and a delay in communication on the DCB side can be averted.

In addition, steps S24 and S25 may be performed just before step S29 (just after the determination "Yes" is made in step S28). In that case, step S23 is followed by step S26.

After step S30, the relay apparatus 200 receives the FCoE frame via the DCB port 231. The relay apparatus 200 de-encapsulates the FCoE frame and takes out the FC frame. The relay apparatus 200 acquires the destination address "0x020300" from the FC frame. The relay apparatus 200 detects from the most significant 8 bits of the destination address that its domain number is designated by the destination. Furthermore, the relay apparatus 200 detects from the next 8 bits of the destination address that the port number "0x03" is designated by the destination. At this time the relay apparatus 200 generates an FCoE frame in which the FC frame is encapsulated, and transmits it from the DCB port 233 corresponding to the port number "0x03". The server 10 can also access the storage apparatus 20 in this way via the path R21.

In FIG. 11, the case where the server 10 accesses the storage apparatus 20 is taken as an example. In a case where the server 10 accesses the storage apparatus 20a, however, the path R21 can be used in the same way as a roundabout path for the path R22. However, the relay apparatus 200 and the storage apparatus 20a are connected by an FC path. Accordingly, the relay apparatus 200 can transmit an FC frame (without being encapsulated) from the FC port 243.

In addition, in a case where the server 10a accesses the storage apparatus 20 or 20a, the path R21 can be used in the same way as a roundabout path for the path R22. However, if the server 10a accesses the storage apparatus 20 or 20a, the relay unit 111 receives an FC frame from the server 10a. The path selection unit 112 acquires the FC frame from the relay unit 111 and performs the frame transfer procedure from the above step S23 (in this case, steps S21 and S22 are skipped).

A communication path of a response from the storage apparatus 20 or 20a to the server 10 or 10a can also be determined in the same way that is used for access from the server 10 or 10a to the storage apparatus 20 or 20a.

As has been described, in the storage system according to the second embodiment both of the paths R21 and R22 which differ in protocol can be used effectively.

After an FC port is selected as a transfer destination of an FC frame in accordance with transfer information, it is difficult to use a DCB port as a transfer destination port even if there is a communication path via the DCB port. As a result, even if a load on the FC port is heavy, an FC frame is transmitted from the FC port. This causes a delay in communication.

Accordingly, the relay apparatus 100 or 200 in the second embodiment holds the transfer tables both for FC and for DCB. After the relay apparatus 100 or 200 specifies an FC port which is a transfer destination of an FC frame, the relay apparatus 100 or 200 checks a state of the FC port. If a load on the FC port is heavy, then the relay apparatus 100 or 200 generates an Ethernet frame (FCoE frame) in which the FC frame is included (encapsulated). Instead of transmitting the FC frame from the FC port, the relay apparatus 100 or 20 then transmits the FCoE frame from a DCB port. As a result, even if the FC port is linked up, the DCB port can be utilized as a roundabout path for the FC port. Transfer information on the FC port side remains. Therefore, when a load on the FC port drops, a frame can be transferred again from the FC port. That is to say, the DCB port can be used as a temporary roundabout path. This makes it possible to prevent a load on the FC port from becoming excessive and to efficiently use communication paths via the DCB port and the FC port.

Furthermore, it is assumed that there is only one piece of transfer information. When a path cannot be used due to, for example, a linkdown, this piece of transfer information may be generated again in order to make a second path usable. In this case, however, the second path cannot be used before this piece of transfer information is generated again. On the other hand, the relay apparatus 100 or 200 holds the transfer tables both for FC and for DCB. Therefore, when an FC port goes into a blocked state, it is possible to begin to use a DCB port early as a roundabout path compared with a case where transfer information is rewritten.

Third Embodiment

A third embodiment will now be described. The differences between the above second embodiment and a third embodiment will mainly be described and description of the same matters will be omitted.

In the second embodiment, the case where the two relay apparatus 100 and 200 are cascade-connected by the paths R21 and R22 is taken as an example. On the other hand, in order to accommodate an increase in the number of nodes connected, three or more relay apparatus can be cascade-connected. Accordingly, in a third embodiment another example of relay apparatus connection will be described.

Figure 12:
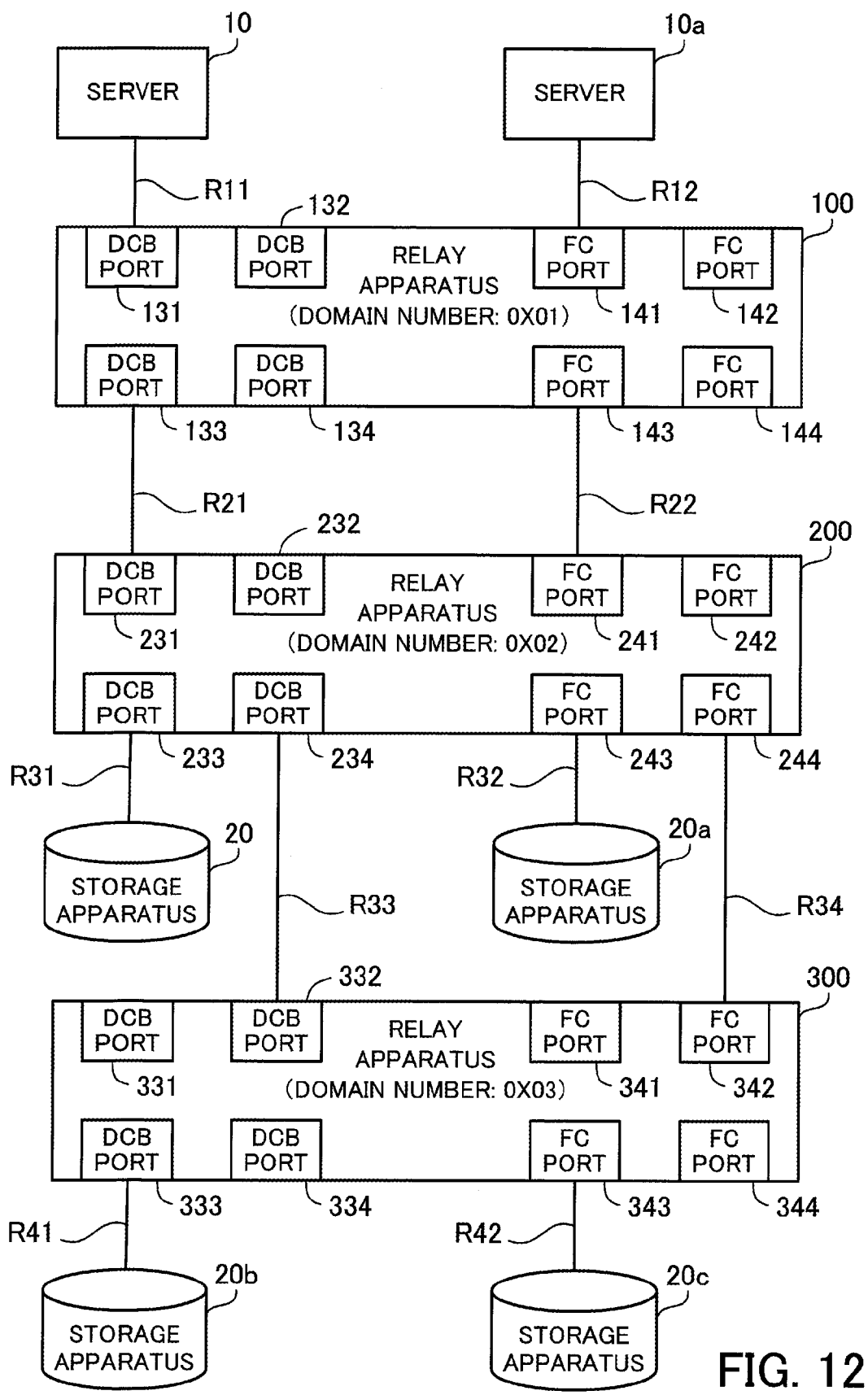
FIG. 12 is an example of connection in a storage system according to a third embodiment.

FIG. 12 is an example of connection in a storage system according to a third embodiment. In a storage system according to a third embodiment a relay apparatus 300 is also connecting to a relay apparatus 200. Storage apparatus 20b and 20c are connected to the relay apparatus 300. Each of the storage apparatus 20b and 20c is the same external storage unit as a storage apparatus 20 or 20a. In this example, a server 10 or 10a can also access the storage apparatus 20b or 20c.

The relay apparatus 300 is an FCoE relay apparatus. An example of hardware of the relay apparatus 300 is the same as the example of hardware of the relay apparatus 100 or 200 described in FIG. 3. An example of software of the relay apparatus 300 is the same as the example of software of the relay apparatus 100 described in FIG. 4. However, the domain number "0x03" is given to the relay apparatus 300. In addition, the relay apparatus 300 includes DCB ports 331, 332, 333, and 334, and FC ports 341, 342, 343, and 344.

The DCB ports 331, 332, 333, and 334 are DCB interfaces. The FC ports 341, 342, 343, and 344 are FC interfaces. It is assumed that the port numbers "0x01", "0x02", "0x03", and "0x04" are virtually assigned to the DCB ports 331, 332, 333, and 334 respectively. In addition, it is assumed that the port numbers "0x05", "0x06", "0x07", and "0x08" are assigned to the FC ports 341, 342, 343, and 344 respectively.

In addition to paths R11, R12, R21, R22, R31, and R32, the storage system according to the third embodiment includes paths R33, R34, R41, and R42. Each path is formed by physically connecting ports by, for example, an FC cable.

The path R33 connects the DCB ports 234 and 332. The path R34 connects the FC ports 244 and 342. The path R41 connects the DCB port 333 and a CNA of the storage apparatus 20b. The path R42 connects the FC port 343 and an FC adapter of the storage apparatus 20c.

FIGS. 13A, 13B, and 13C are examples of an FC transfer table in the third embodiment. FIG. 13A is an example of an FC transfer table 121a stored in a memory 120. FIG. 13B is an example of an FC transfer table 221a stored in a memory 220. FIG. 13C is an example of an FC transfer table 321 held by the relay apparatus 300.

Each of the FC transfer tables 121a, 221a, and 321 includes Domain Number and Port Number items. Contents set in each item are the same as those in the FC transfer table 121 or 221 described in FIG. 5A or 5B.

For example, the domain number "0x03" and the port number "0x07" are registered in the FC transfer table 121a. These pieces of information indicate that if a relay apparatus 100 transfers an FC frame to the relay apparatus 300 (domain number of which is "0x03"), the relay apparatus 100 preferably uses an FC port 143 (port number of which is "0x07"). An FC frame transferred to the relay apparatus 300 is an FC frame in which "0x03" is set in a domain number portion of D_ID.

Furthermore, for example, the domain number "0x03" and the port number "0x08" are registered in the FC transfer table 221a. These pieces of information indicate that if the relay apparatus 200 transfers an FC frame to the relay apparatus 300, the relay apparatus 200 preferably uses the FC port 244 (port number of which is "0x08").

In addition, for example, the domain number "0x01" and the port number "0x06" are registered in the FC transfer table 321. These pieces of information indicate that if the relay apparatus 300 transfers an FC frame to the relay apparatus 100 (domain number of which is "0x01"), the relay apparatus 300 preferably uses the FC port 342 (port number of which is "0x06").

FIGS. 14A, 14B, and 14C are examples of a MAC transfer table in the third embodiment. FIG. 14A is an example of a MAC transfer table 123a stored in the memory 120. FIG. 14B is an example of a MAC transfer table 223a stored in the memory 220. FIG. 14C is an example of a MAC transfer table 323 held by the relay apparatus 300.

Each of the MAC transfer tables 123a, 223a, and 323 includes MAC Address, Domain Number, State, and Port Number items. Contents set in each item are the same as those in the MAC transfer table 123 or 223 described in FIG. 7A or 7B.

For example, the MAC address "MAC2", the domain number "0x03", the state "connected", and the port number "0x03" are registered in the MAC transfer table 123a. These pieces of information indicate that if an FCoE frame is transferred to the relay apparatus 300 (domain number of which is "0x03") by the use of a DCB port, a DCB port 133 (port number of which is "0x03") preferably is used and that a destination MAC address of the FCoE frame is set preferably to "MAC2".

Furthermore, for example, the MAC address "MAC3", the domain number "0x03", the state "connected", and the port number "0x04" are registered in the MAC transfer table 223a. These pieces of information indicate that if an FCoE frame is transferred to the relay apparatus 300 (domain number of which is "0x03") by the use of a DCB port, the DCB port 234 (port number of which is "0x04") preferably is used and that a destination MAC address of the FCoE frame is set preferably to "MAC3".

In addition, for example, the MAC address "MAC2", the domain number "0x01", the state "connected", and the port number "0x02" are registered in the MAC transfer table 323. These pieces of information indicate that if an FCoE frame is transferred to the relay apparatus 100 (domain number of which is "0x01") by the use of a DCB port, the DCB port 332 (port number of which is "0x02") preferably is used and that a destination MAC address of the FCoE frame is set preferably to "MAC2".

The relay apparatus 100, 200, and 300 construct the MAC transfer tables 123a, 223a, and 323, respectively, in accordance with the procedure described in FIG. 10. The MAC transfer table 123a differs from the MAC transfer table 123 in that it includes an entry including the domain number "0x03". This entry is registered in the MAC transfer table 123a in, for example, the following way.

When the relay apparatus 300 is connected to the relay apparatus 200, the relay apparatus 200 registers an entry for transfer to the relay apparatus 300 in the MAC transfer table 223a in accordance with the procedure described in FIG. 10. This entry defines the correspondence among the MAC address "MAC3", the domain number "0x03", and the port number "0x04". When a new entry is additionally registered in the relay apparatus 200, the relay apparatus 100 acquires a domain number ("0x03", in this example) included in the entry. The relay apparatus 100 registers in the MAC transfer table 123a an entry in which the acquired domain number "0x03" is associated with the MAC address "MAC2" of the relay apparatus 200 from which the domain number "0x03" is acquired. At this time there already exists an entry in which the domain number "0x02" is associated with the MAC address "MAC2". The port number "0x03" and the state "connected" are already registered for the "MAC2". Accordingly, the port number "0x03" and the state "connected" can also be registered in the entry in which the domain number "0x03" is associated with the same MAC address "MAC2". However, the port number "0x03" and the state "connected" corresponding to the domain number "0x03" may be registered in a multicast frame for alive monitoring transmitted periodically to the DCB port side at timing at which a response from the MAC address "MAC2" is received.

Each of the relay apparatus 100, 200, and 300 may add its domain number to a response to a multicast frame for alive monitoring. For example, a domain number may be added to the Data field of an Ethernet frame. By doing so, each relay apparatus can check in detail, for example, whether each of the other relay apparatus is on or off.

For example, in the third embodiment an FC frame may be relayed, as in the second embodiment, by the use of the FC transfer tables 121a, 221a, and 321 in preference to the MAC transfer tables 123a, 223a, and 323. In this case, each of the relay apparatus 100, 200, and 300 also performs the frame transfer procedure described in FIG. 11 on the basis of a MAC transfer table it holds. By doing so, each of the relay apparatus 100, 200, and 300 can use a DCB path as a roundabout path for an FC path even if the FC path can be used. For example, when the server 10 accesses the storage apparatus 20b, the path R21 can be used as a roundabout path for the path R22 or the path R33 can be used as a roundabout path for the path R34. As a result, even if the relay apparatus 100, 200, and 300 are cascade-connected as in the storage system according to the third embodiment, the DCB path R21 or R33 can effectively be used for the FC path R22 or R34.

Fourth Embodiment

A fourth embodiment will now be described. The differences between the above second or third embodiment and a fourth embodiment will mainly be described and description of the same matters will be omitted.

In the second or third embodiment, after an FC port is specified as a transfer destination port on the basis of an FC transfer table, a transfer destination port is changed to a DCB port according to a load on the FC port. On the other hand, after a DCB port is specified as a transfer destination port on the basis of a MAC transfer table, a transfer destination port may be changed to an FC port according to a load on the DCB port. The following case is taken as an example.

In the second embodiment it is assumed that the FC path R22 is linked down and that only the DCB path R21 can be used. In this case, the relay apparatus 100 encapsulates an FC frame in an FCoE frame and transfers the FCoE frame by the use of the path R21, on the basis of the MAC transfer table 123. After that, the FC path R22 may recover by maintenance work or the like. At this time the relay apparatus 100 may exercise control so as to continuously use the DCB path R21 which it has been using. Even in such a case, it is desirable to be able to use the FC path R22 as a roundabout path for the DCB path R21. A procedure for realizing this will be described.

A storage system according to a fourth embodiment is the same as the storage system according to the second embodiment. Furthermore, in the following description it is assumed that FC transfer tables 121 and 221, a name server database 122, MAC transfer tables 123 and 223, and a policy management table 124 have already been generated in relay apparatus 100 and 200. However, it is assumed that a policy which makes it possible to use an FC path R22 as a roundabout path for a DCB path R21 is registered in the policy management table 124.

Figure 15:
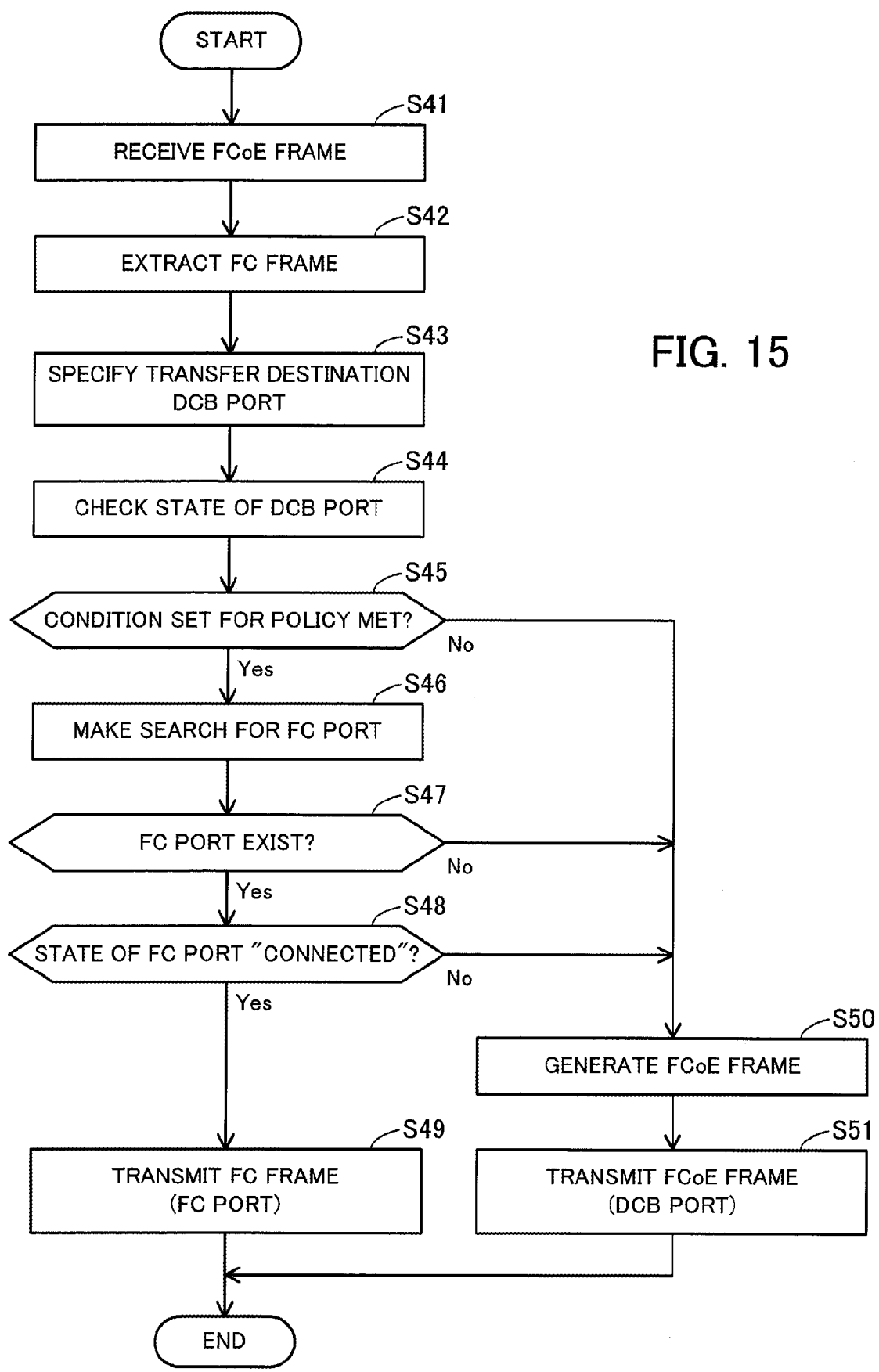
FIG. 15 is a flow chart of an example of frame transfer in a fourth embodiment.

FIG. 15 is a flow chart of an example of frame transfer in the fourth embodiment. A process indicated in FIG. 15 will now be described in order of step number. In the following description a case where a server 10 accesses a storage apparatus 20 will be taken as an example.

(Step S41) A relay unit 111 receives an FCoE frame from the server 10 via a path R11. A destination MAC address of the FCoE frame is the MAC address "MAC1" of the relay apparatus 100. A destination address of an FC frame included in the FCoE frame is the port ID "0x020300" of a port included in the storage apparatus 20.

(Step S42) The relay unit 111 removes a header of the FCoE frame, extracts the FC frame, and outputs the FC frame to a path selection unit 112.

(Step S43) The path selection unit 112 acquires the domain number "0x02" of a destination from the most significant 8 bits of the destination address set in the FC frame. The path selection unit 112 refers to the MAC transfer table 123 stored in a memory 120, and acquires the port number "0x03" of a DCB port 133.

(Step S44) The path selection unit 112 checks the state of the DCB port 133. For example, the path selection unit 112 acquires the ratio of used bands to all bands on the basis of, for example, the current amount of transferred data at the DCB port 133 or the average of the amounts of transferred data at the DCB port 133 in a past determined period. The path selection unit 112 may check the connected or blocked state of the DCB port 133.

(Step S45) The path selection unit 112 refers to the policy management table 124 stored in the memory 120, and checks a policy. The path selection unit 112 then determines whether or not the state of the DCB port 133 meets a condition (condition for path bypassing) set for the policy. If the state of the DCB port 133 meets the condition set for the policy, then the path selection unit 112 proceeds to step S46. If the state of the DCB port 133 does not meet the condition set for the policy, then the path selection unit 112 proceeds to step S50.

(Step S46) The path selection unit 112 refers to the FC transfer table 121 stored in the memory 120, and makes a search for an FC port 143 used as a roundabout path. To be concrete, the path selection unit 112 makes a search for the port number "0x07" corresponding to the domain number "0x02" of the FC frame destination acquired in step S43.

(Step S47) The path selection unit 112 determines whether on not it can make a search for an FC port in step S46. That is to say, the path selection unit 112 determines whether on not there is an FC port to be used as a roundabout path. If there is an FC port to be used as a roundabout path, then the path selection unit 112 proceeds to step S48. If there is no FC port to be used as a roundabout path, then the path selection unit 112 proceeds to step S50.

(Step S48) The path selection unit 112 determines whether or not the FC port (in this case, the FC port 143) which it makes a search for in step S46 is linked up. If the FC port is linked up, then the path selection unit 112 proceeds to step S49. If the FC port is not linked up, then the path selection unit 112 proceeds to step S50. For example, the path selection unit 112 may manage, as in the MAC transfer table 123, a state, such as "connected" (linkup), "blocked" (linkdown), or the like, of each FC port in the FC transfer table 121. By doing so, if the state of the FC port 143 is "connected" in the FC transfer table 121, then the path selection unit 112 can determine in this step S48 that the FC port 143 is linked up. On the other hand, if the state of the FC port 143 is "blocked" in the FC transfer table 121, then the path selection unit 112 can determine in this step S48 that the FC port 143 is not linked up.

(Step S49) The path selection unit 112 informs the relay unit 111 of the port number "0x07" of the FC port (in this case, the FC port 143) which it makes a search for in step S46. The relay unit 111 transmits the FC frame extracted in step S42 from the FC port 143 corresponding to the port number "0x07". The relay unit 111 then terminates the process.

(Step S50) The path selection unit 112 informs the relay unit 111 of the port number "0x03" of the DCB port (in this case, the DCB port 133) specified in step S43 and the corresponding MAC address "MAC2". The relay unit 111 encapsulates the FC frame extracted in step S42 in an Ethernet frame to generate an FCoE frame. A destination MAC address of the FCoE frame is "MAC2". A source MAC address of the FCoE frame is the MAC address "MAC1" of the relay apparatus 100. A determined value corresponding to FCoE is set in the VLAN Tag field of the FCoE frame. A determined value indicative of FCoE is set in the Type field of the FCoE frame.

(Step S51) The relay unit 111 transmits the FCoE frame generated in step S50 from the DCB port 133 corresponding to the port number "0x03". The relay unit 111 then terminates the process.

As has been described, the relay apparatus 100 specifies a transfer destination DCB port, and then transmits an FC frame from an FC port instead of transmitting an FCoE frame in which the FC frame is encapsulated from a selected DCB port, depending on the state of the DCB port.

Steps S44 and S45 may be performed just before step S49 (just after the determination "Yes" is made in step S48). In that case, step S43 is followed by step S46.

In FIG. 15, the case where the server 10 accesses the storage apparatus 20 is taken as an example. In a case where the server 10 accesses a storage apparatus 20a, however, the path R22 can also be used in the same way as a roundabout path for the path R21.

In addition, in a case where a server 10a accesses the storage apparatus 20 or 20a, the path R22 can also be used in the same way as a roundabout path for the path R21. However, if the server 10a accesses the storage apparatus 20 or 20a, the relay unit 111 receives an FC frame from the server 10a. The path selection unit 112 acquires the FC frame from the relay unit 111 and performs the frame transfer procedure from the above step S43 (in this case, steps S41 and S42 are skipped).

As a result, in the fourth embodiment the FC path R22 can effectively be used in place of the DCB path R21. This is the same with the second or third embodiment.

According to an embodiment, a communication path can efficiently be used.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A relay apparatus used for relaying a first type of frame and a second type of frame which can include the first type of frame, the relay apparatus comprising:
    a plurality of first ports which transmit the first type of frame, which type corresponding to a first communication protocol, to another relay apparatus;
    a plurality of second ports which transmit the second type of frame, which type corresponding to a second communication protocol, to said another relay apparatus;
    a memory which stores first transfer information of the first communication protocol for specifying a first transfer destination port of the first type of frame and second transfer information of the second communication protocol for specifying a second transfer destination port of the second type of frame, the first transfer destination port being one of the plurality of first ports, the second transfer destination port being one of the plurality of second ports; and a processor configured to perform a procedure including:

generating, after specifying, based on the first transfer information, the first transfer destination port of the first type of frame for accessing a node connected to said another relay apparatus, a transfer frame which is the second type of frame including the first type of frame according to a load on the first transfer destination port;

determining, based on the second transfer information, the second transfer destination port for transmitting the transfer frame; and transmitting the transfer frame from the second transfer destination port instead of transmitting the first type of frame from the first transfer destination port.

2. The relay apparatus according to claim 1, wherein the procedure further includes determining to transmit the transfer frame when a load value calculated based on a state of the first transfer destination port is greater than a determined threshold.

3. The relay apparatus according to claim 2, wherein whether or not the load value is greater than the determined threshold is determined by using a threshold corresponding to a combination of a source address and a destination address included in the first type of frame.

4. A relay apparatus used for relaying a first type of frame and a second type of frame which can include the first type of frame, the relay apparatus comprising:

a plurality of first ports which transmit the first type of frame, which type corresponding to a first communication protocol, to another relay apparatus;

a plurality of second ports which transmit the second type of frame, which type corresponding to a second communication protocol, to said another relay apparatus;

a memory which stores first transfer information of the first communication protocol for specifying a first transfer destination port of the first type of frame and second transfer information of the second communication protocol for specifying a second transfer destination port of the second type of frame, the first transfer destination port being one of the plurality of first ports, the second transfer destination port being one of the plurality of second ports; and a processor configured to perform a procedure including:

determining, after specifying, based on the second transfer information, the second transfer destination port of a transfer frame which is the second type of frame including the first type of frame for accessing a node connected to said another relay apparatus, the first transfer destination port of the first type of frame based on the first transfer information according to a load on the second transfer destination port; and transmitting the first type of frame from the first transfer destination port instead of transmitting the transfer frame from the second transfer destination port.

5. A relay method for relaying a first type of frame and a second type of frame which can include the first type of frame, the method comprising:

specifying, by a relay apparatus including a plurality of first ports which transmit the first type of frame, which type corresponding to a first communication protocol, to another relay apparatus and a plurality of second ports which transmit the second type of frame, which type corresponding to a second communication protocol, to said another relay apparatus, based on first transfer information of the first communication protocol, a first transfer destination port of the first type of frame for accessing a node connected to said another relay apparatus, the first transfer destination port being one of the plurality of first ports;

generating, by the relay apparatus, a transfer frame which is the second type of frame including the first type of frame according to a load on the first transfer destination port;

determining, by the relay apparatus, based on second transfer information of the second communication protocol, a second transfer destination port for transmitting the transfer frame, the second transfer destination port being one of the plurality of second ports; and transmitting, by the relay apparatus, the transfer frame from the second transfer destination port instead of transmitting the first type of frame from the first transfer destination port.

6. A relay method for relaying a first type of frame and a second type of frame which can include the first type of frame, the method comprising specifying, by a relay apparatus including a plurality of first ports which transmit the first type of frame, which type corresponding to a first communication protocol, to another relay apparatus and a plurality of second ports which transmit the second type of frame, which type corresponding to a second communication protocol, to said another relay apparatus, based on second transfer information of the second communication protocol, a second transfer destination port of a transfer frame which is the second type of frame including the first type of frame for accessing a node connected to said another relay apparatus, the second transfer destination port being one of the plurality of second ports;

determining, by the relay apparatus, based on first transfer information of the first communication protocol, a first transfer destination port for transmitting the first type of frame, the first transfer destination port being one of the plurality of first ports, according to a load on the second transfer destination port; and transmitting, by the relay apparatus, the first type of frame from the first transfer destination port instead of transmitting the transfer frame from the second transfer destination port.

* * * * *